March 11, 1930.  W. E. SYKES  1,750,028
CUTTER RELIEF MECHANISM FOR MACHINE TOOLS
Filed July 14, 1921  4 Sheets-Sheet 3

Inventor
W. E. Sykes
by Wilkinson & Giusta
Attorneys.

March 11, 1930.   W. E. SYKES   1,750,028
CUTTER RELIEF MECHANISM FOR MACHINE TOOLS
Filed July 14, 1921   4 Sheets-Sheet 4

Inventor
W. E. Sykes
By Henry E. Rockwell
Attorney

Patented Mar. 11, 1930

1,750,028

UNITED STATES PATENT OFFICE

WILLIAM EDWIN SYKES, OF SLOUGH, ENGLAND

CUTTER RELIEF MECHANISM FOR MACHINE TOOLS

Application filed July 14, 1921, Serial No. 484,713, and in Great Britain August 30, 1920.

This invention relates broadly to the cutter relief mechanism of machine tools, more especially wherein the cutter and work have a relative reciprocating motion.

In an application, Serial No. 641,126, filed May 24, 1923, I have described and claimed a machine for generating double helical gears embodying certain features of the present invention. In this present case, however, I claim the cutter relief mechanism broadly as applied to machine tools generally and without limitation to a gear cutting or generating machine. The relief mechanism claimed, while particularly applicable to machines adapted for cutting either straight tooth gears, or single helical or double helical gears, is applicable also to machines for cutting various forms of teeth, ribs or grooves on various forms of work. My improvements are especially useful when, as is frequently the case, it is desired that the cutter form either a grooved recess or a rib which extends inwardly from an outer edge of the work and there abruptly terminates at a shoulder, or by such abrupt termination forms a sharply defined shoulder.

In machines of the general type above mentioned, it is usual to either withdraw the work slightly away from the cutter on the return or non-operative stroke, or to slightly withdraw the cutter from the work. Mechanism hitherto employed for effecting the withdrawal of the cutter away from the work has been arranged to tilt the cutter on the return stroke, but although such mechanism works satisfactorily for the average class of work, it does not give the degree of precision required for the highest class of work, especially when cutting close up to a well defined shoulder. Likewise, the mechanism employed for effecting the withdrawal of the work away from the cutter is fairly satisfactory for some classes of work but is even less precise than when the cutter is withdrawn, in that the mechanism employed in such a case is usually more or less complicated and in cases of large and heavy blanks is cumbersome and, therefore, difficult to move as rapidly as is required for such an operation.

The chief object, therefore, of this invention is to provide an improved cutter relief mechanism for a machine in which there is a relative reciprocating movement between the cutter and the work and wherein it is desired to relieve the cutter from contact with the work during the inoperative or non-cutting stroke by motion of the cutter itself.

Another object of this invention is to provide a cutter relief mechanism which will be adaptable for use on all classes of reciprocating metal cutting machines, wherein either one cutter is used or wherein a plurality of cutters working alternately or together are used.

A still further object of this invention is to provide a cutter relief mechanism which will give satisfactory service in such types of machines, especially where the cutter or cutters are required to form either a grooved recess or a rib upon the surface of the work, extending inwardly from an edge of the work and terminating abruptly either at a shoulder already present or a shoulder formed by the cut itself.

To these and other ends, the invention consists in the novel features and combination of parts to be hereinafter described and claimed.

The invention will be described with reference to the accompanying drawings, wherein it is shown applied to a machine which is similar in construction to that referred to in my prior U. S. Patent No. 1,323,120 and which is adapted to cut double helical teeth on a circular blank by means of a pair of reciprocating pinion shaped cutters.

The general construction and operation of the machine selected to which the invention is applied, is as follows:

Through suitable mechanism, comprising, in this instance, a power-driven pulley shaft $g$ connected by a worm wheel and worm to the crank disk $m$, the crank pin $m^1$, and crank block $m^2$, the carriage $l$ is reciprocated in a plane parallel with the face of a blank B. Cutter supports or cutter spindle housing $e$ and $f$ are slidably mounted upon inclined guide members or saddles $p$ by guide plates $o^1$. The guide members $p$ are secured to and in proper position on the carriage $l$ by clamps $p^1$ and reciprocated therewith, whereby the cutter shafts $c$ and $d$, with the cutters $a$ and $b$, are also reciprocated across the face of the blank B. During this movement, the cutters are given a twisting movement by the helical screws $h$ and $i$, respectively, which slide with the cutter shafts through the cutter control mechanism carriers $u^1$, and are guided by the helical guide nuts $j$ and $k$. Because of this arrangement, one cutter is cutting into the blank while moving from an edge of the same toward the center thereof, while the other cutter is being withdrawn from the blank. The cutter which is not cutting is forced away from the blank and out of contact therewith by the action between the inclined surfaces of the guide members $p$ and the bases of the cutter spindle housings $e$ and $f$. Stops $p^2$ and $p^3$ are provided on each of the guide members $p$ to limit the amount of relief and to act as the driving connection between the parts, $p^2$ driving the housing in one direction, while, upon the reversal of the reciprocating movement, $p^3$ drives the housing in the other direction. The amount of relief given the cutter depends upon the angle of inclination of the contacting surfaces of the guide members $p$ and the bases $o$, and the amount of lost motion extending between the base of the housing and the stops $p^2$ and $p^3$. Springs $s$ secured within the stops $p^3$ and extending into the housing bases tend to keep the housings $e$ and $f$ in the cutting position and assist the parts to adjust themselves at the completion of the backward or non-cutting stroke. The tension of the springs S is adjustable by means of set screws $s^1$. It is, therefore, obvious that each cutter is relieved from contact with the blank during its withdrawal therefrom or non-cutting stroke in a direction at right angles to the direction of its travel, which facilitates the operation of such a cutter in cutting a groove or tooth close up to a shoulder, which operation has been particularly difficult when relieving mechanisms of the swinging type have been used.

The shaft $c$ connected to the cutter $a$ is directly connected to the helical screw $h$, and the shaft $d$ controlling the cutter $b$ is connected to the helical screw $i$. The helical screws $h$ and $i$ are necessarily closely confined within the carriers $u^1$ in order to properly cooperate with the guide nuts $j$ and $k$ and, therefore, of these carriers are allowed to remain stationary during the operation above described, the shafts $c$ and $d$ would be distorted and forced out of alignment with their respective helical screws when the relieving action given to the cutters takes place. In order to overcome this distortion which might be injurious to the parts, the carriers $u^1$ are also given a back and forth movement, simultaneously with the cutter relieving movement. This is accomplished by the use of cams $v$ mounted upon the rock shafts $v^1$ which are operated in the proper timed relation with the reciprocating movement of the carriage $l$ by the various levers and links $v^2$, $v^3$, $v^4$, shaft $t$, levers $t^2$, $t^3$ and $t^4$, which are controlled by the cam $t^6$ secured upon the same shaft as the crank disk $m$. In addition to the cams $v$ which force the carriers $u^1$ inwardly, spring abutments $x$ secured to the bracket $u$ return the carriers to their forward position when released from the cam action. The spring abutments $x$ act against a lug $w^1$ secured upon the carrier casing and force the carrier outwardly against an adjustable limiting stop $y$ which is mounted upon the bracket $u$.

In certain cases, especially when helical guide nuts having a comparatively slow pitch or short lead are used, and the co-efficient of friction in the helical guides is comparatively high, the relief action will operate reliably, but should the co-efficient of friction be comparatively low in the helical guides or alternatively should the lead of the guides be long or should the lead be infinite, which is the case when straight guides are used, then the friction will not be sufficient to hold the housings $e$ and $f$ at the commencement of the return or non-operative strokes of the saddles.

In order to make the relief action independent of any inertia or frictional effect, I arrange in proximity to each of the cutter spindle housings $e$ and $f$, and in a manner to cooperate with an abutment piece $e'$ or $f'$, thereon, a cam lever $q$, which is keyed to a shaft $r$ that is mounted to rock in bearings $o^2$ arranged in lugs projecting from the upper guide plates $o'$. The cam levers $q$ are mounted to slide on and rock with shaft $r$, the levers being set in such relative angular positions and the cam faces on the levers being so disposed that when the rocking shaft $r$ turns in one direction, the cam on one of the levers will engage with its cooperating abutment and simultaneously the other lever will disengage from its cooperating abutment. The engaging action of the cams is so timed by mechanism hereafter described as to occur at the end of the cutting stroke and to continue for the period during which the stops $p^2$ are out of action, thus, as will be understood preventing motion of the cutters axially due to friction in the angularly disposed guides. The movement of the cams is also timed to disengage before the commencement of the cutting stroke.

Figure 1:
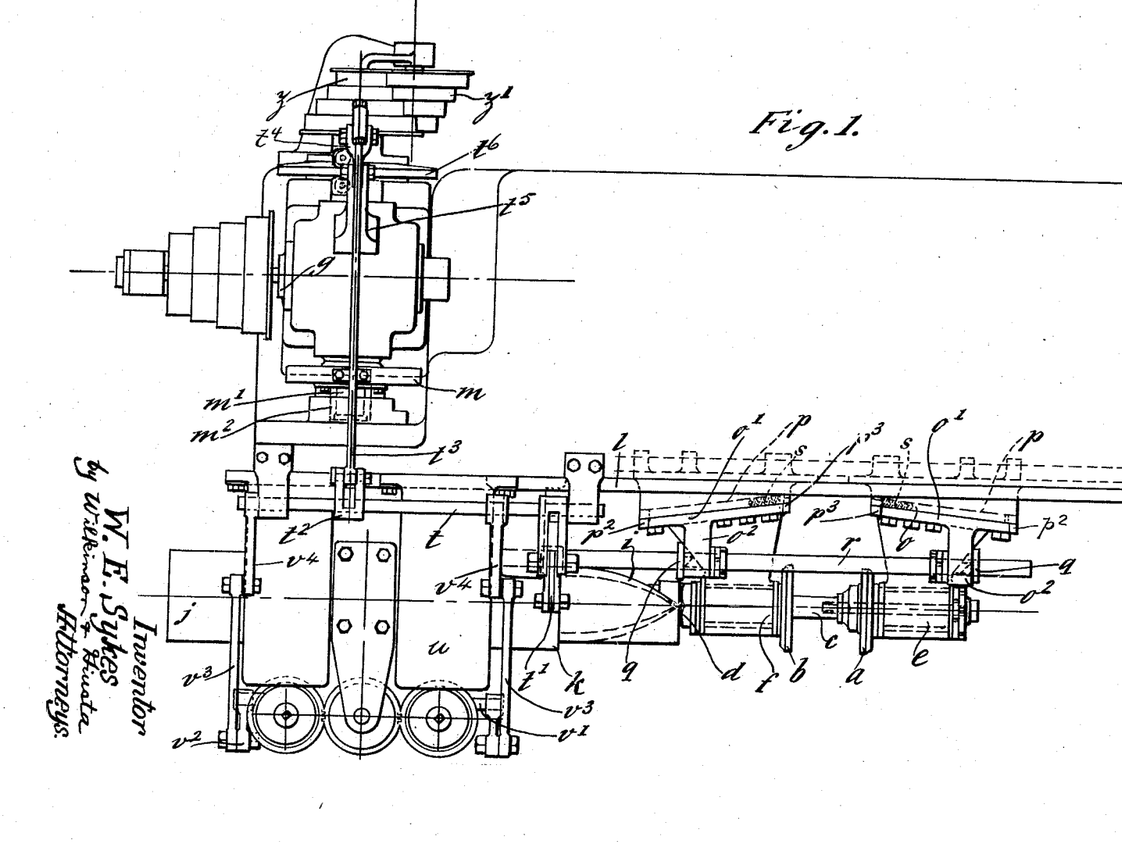
Fig. 1 is a plan of a part of a machine having the invention applied.
Figure 2:
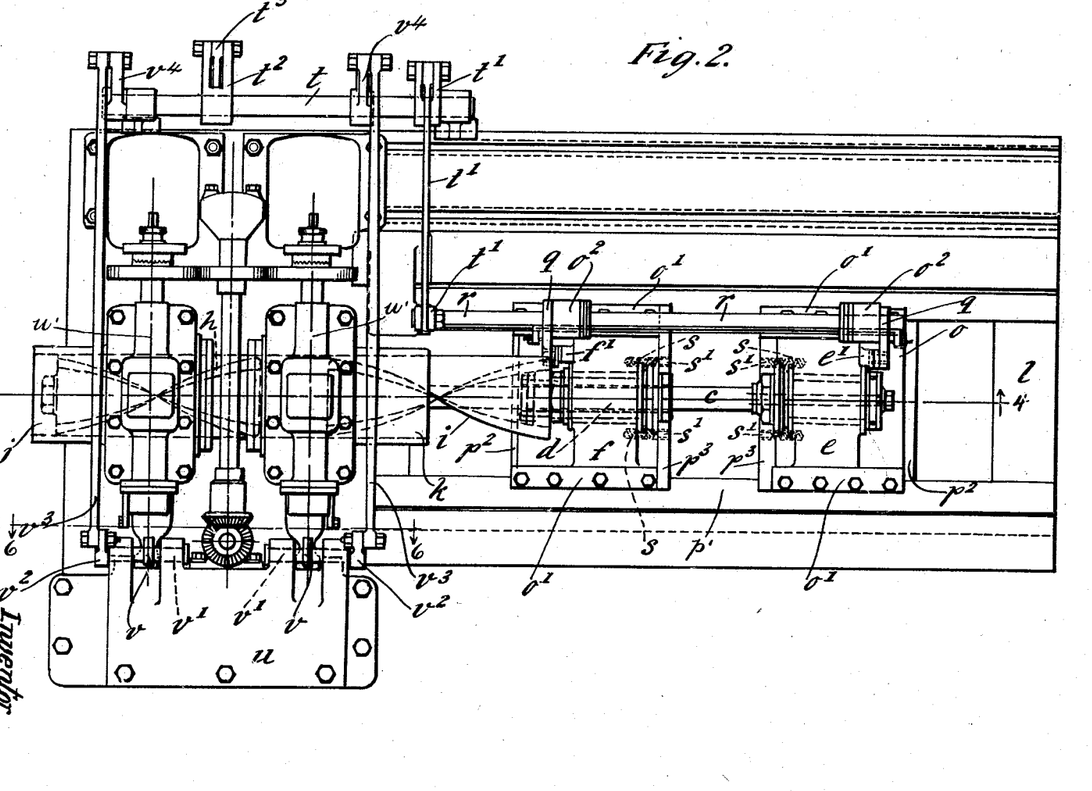
Fig. 2 is a front elevation of the same machine.
Figure 3:
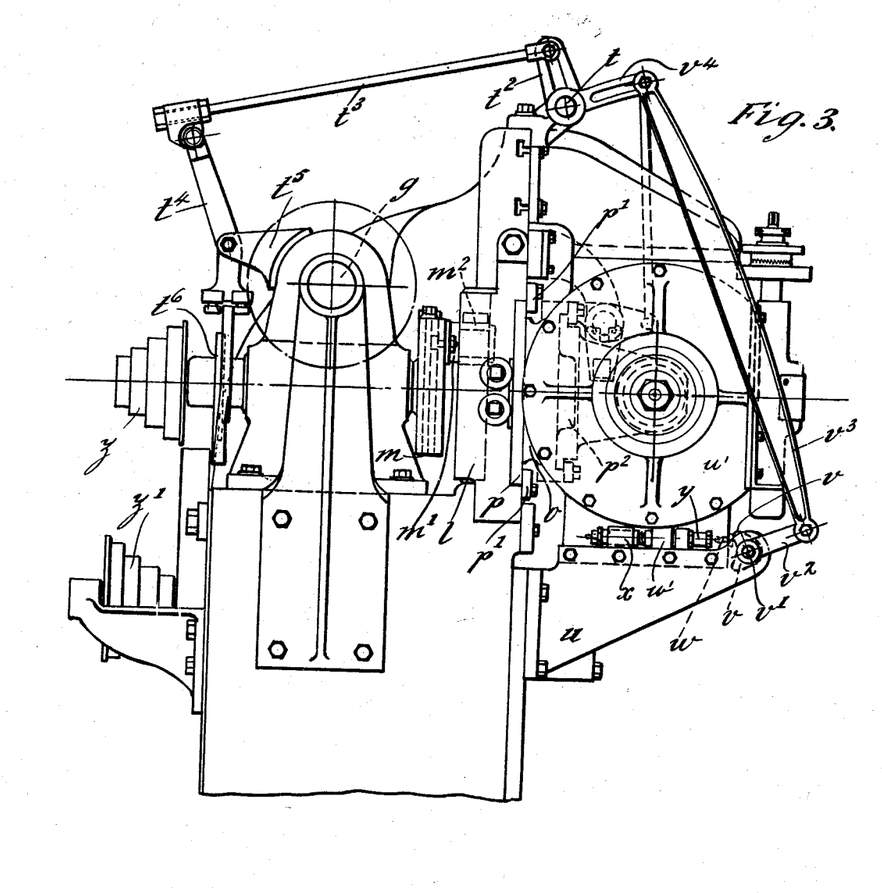
Fig. 3 is an end elevation of the same machine.
Figure 4:
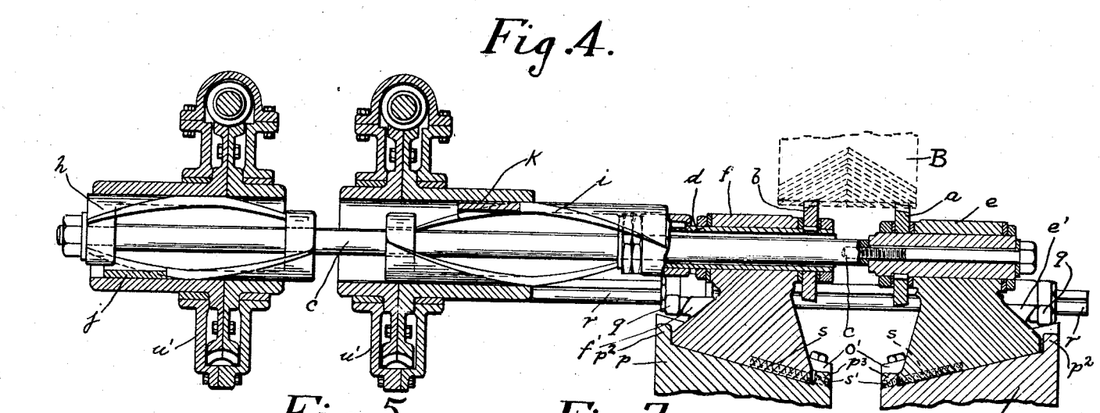
Fig. 4 is section 4—4 of Fig. 2.
Figure 5:
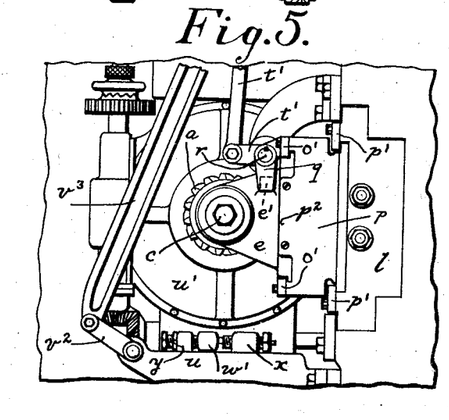
Fig. 5 is a right-hand end elevation of certain parts of the machine.
Figures 6, 7:
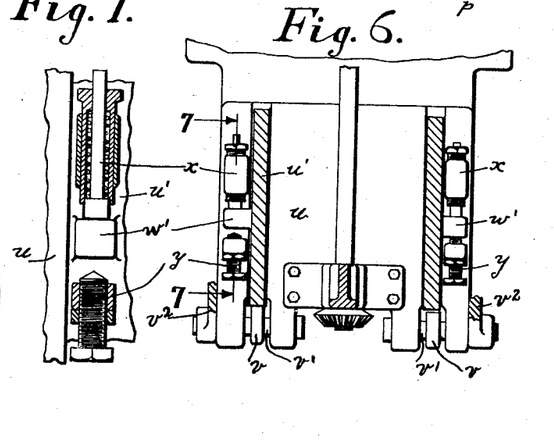
Fig. 6 is section 6—6 of Fig. 2.
Fig. 7 is section 7—7 of Fig. 6.

The shaft $r$ may be rocked in any suitable manner, but the means shown in the drawings are convenient and comprise a rock shaft $t$ which is operatively connected to shaft $r$ by lever and link mechanism $t'$. The shaft $t$ is operatively connected by lever and link mechanism $t^2$, $t^3$ to the upper arm of a lever $t^4$ pivotally mounted between its ends on a bracket $t^5$ fixed to the machine. The lower arm of lever $t^4$ is adapted to cooperate with a cam $t^6$ which is of disc formation (Fig. 3) and is keyed to the shaft that is driven by the above mentioned worm and worm wheel gearings operated from the cone pulley shaft $g$. As the cam $t^6$ revolves, the lever $t^4$ will be rocked and the rocking movement will be transmitted by the said lever and link mechanisms $t^2$, $t^3$ to the shaft $t$.

Specifically the cutter relief mechanism of this invention consists of a cutter support having a flanged base portion $o$ slidably mounted upon a saddle $p$ by suitable means, such as the guide plates $o'$. At the ends of the saddle member and located to act as stop and driving means for the cutter support are integral lugs $p^2$ and $p^3$. Between those lugs the cutter support is allowed a limited amount of longitudinal sliding movement or lost motion, the distance between the lugs $p^2$ and $p^3$ being greater than the length of the base $o$ of the cutter support $f$. The abutting surfaces of the cutter support base $o$ and the saddle $p$ are inclined longitudinally so that the cutter support when against the lug $p^2$ will extend outwardly therefrom a greater distance than when it is against the lug $p^3$.

The cutter supports, not being directly secured upon the reciprocating part of the machine, but being driven solely by the action of the alternately abutting stops $p^2$ and $p^3$ upon the saddle $p$, which is directly secured to the reciprocating part of the machine, will lag at the end of each stroke, that is to say, as soon as one or other of the two corresponding stops, for instance, stop $p^2$ moves out of contact with the adjacent end face of the cutter support base $o$, the support will lag or remain stationary until the other stop, that is, stop $p^3$, makes contact with the other end face of the base $o$. During the periods in which the cutter spindle housing lags it will have no movement in a direction parallel to the face of the work, provided the force due to the friction in the angular guides is less than the force due to the inertia of the cutter spindle housing. During these periods of lag the cutter will be bodily withdrawn from the work or pushed in the opposite direction by reason of the action of the angularly disposed guide. In certain instances, however, it will be necessary as above pointed out, to provide positive retaining means for the cutter supports during these periods of lag, which means may be automatic in operation or otherwise. It will, therefore, be readily understood that the amount of reciprocating movement of saddle $p$ which is additional to the reciprocating movement of housing $f$ is used, by means of the aforesaid angularly disposed guide, to move the cutter away from the work in a direction at right angles to the face thereof and thus impart a relieving motion to the cutter before and during the return stroke, provided the direction of inclination of the angularly disposed guide is arranged in correct relation to the cutting face of the cutter.

In the construction particularly described and shown in the drawings, the invention is shown applied to a machine employing two cutters having their axes horizontally disposed, but it may be applied to machines employing one cutter only or to machines employing any other number of cutters, or to machines employing cutters with axes disposed in any plane. The method of mounting the cutters co-axially with the controlling guides may be departed from. Any other positions of the respective axes may be adopted, or any other form of driving connection between the cutters and the helical guides may be adopted.

While I have shown and described my invention as applied to a certain type of machine, it is not limited to said application as it is obvious that the relief mechanism described is applicable to other types of machines now in use in the cutting of other and various classes of work, nor is the invention limited to the preferred embodiment shown in all its details but is capable of many modifications and variations which will lie within the spirit of the invention and within the scope of the appended claims.

I claim—

1. Cutter relief mechanism for machine tools, comprising a reciprocable member and a tool support slidingly mounted thereon, said tool support being adjustable relatively to said reciprocable member in the direction of the reciprocating movement thereof, each having cooperating means whereby, when one is moved relatively to the other, a relative movement between said parts at right angles to the direction of the first named movement is effected.

2. Cutter relief mechanism for machine tools, comprising a reciprocable member and a tool support slidingly mounted thereon, said tool support being adjustable relatively to said reciprocable member in the direction of the reciprocating movement thereof, said parts having cooperating means whereby one is engaged by the other for reciprocation thereby, and other cooperating means whereby when one is slidingly moved relatively to the other a relative bodily movement between the parts in a direction transverse to that of the first mentioned movement is effected.

3. Cutter relief mechanism for machine tools, comprising a reciprocable member and a tool support sliding mounted thereon, said parts having cooperating means whereby one is engaged by the other for reciprocation thereby, and other cooperating means whereby, when one is moved relatively to the other a relative movement between said parts, at right angles to the direction of the first mentioned movement, is obtained, and means adapted to resist the action of said engaging means, when said parts are reciprocated in one direction and to assist the same, when said parts are reciprocated in another direction.

4. Cutter relief mechanism for machine tools, comprising a longitudinally reciprocable member, a tool support slidingly mounted thereon, means to longitudinally adjust said tool support with respect to said member, means at each end of said member adapted to alternately engage said tool support to reciprocate the same in opposite directions, and cooperating means between said parts whereby one is moved at right angles to the direction of the reciprocating movement, relatively to the other, when said tool support engaging means are alternating.

5. Cutter relief mechanism for machine tools, comprising a reciprocable member and a tool support slidingly mounted thereon, means at each end of said member to engage said support alternately as the reciprocating movement alternates, there being lost motion allowed between said engaging means and said support whereby said support may lag before being alternately reciprocated, means to cause said support to lag, and cooperating means between said parts whereby one is moved at right angles to the direction of the reciprocating movement relatively to the other, when said support is lagging.

6. In a metal cutting machine, a reciprocating carriage, a cutter relief mechanism including a pair of members slidingly secured together, one of said members being mounted upon said carriage and being adjustable thereon longitudinally thereof, a cutter mounted upon the other of said members, said members being adapted to bodily move relatively to each other at the completion of each reciprocating stroke transversely to the direction of the reciprocating movement of said carriage.

7. In a metal cutting machine, a reciprocating carriage, a cutter relief mechanism including a pair of members slidingly secured together, one of said members being mounted upon said carriage, a cutter mounted upon the other of said members, said members being adapted to bodily move relatively to each other at the completion of each reciprocating stroke transversely to the direction of the reciprocating movement of said carriage, and operable means to positively insure the relative transverse movement between said members.

8. In a metal cutting machine, a reciprocating carriage, a cutter relief mechanism including a pair of members slidingly secured together, one of said members being mounted upon said carriage, a cutter mounted upon the other of said members, said members being adapted to bodily move relatively to each other at the completion of each reciprocating stroke transversely to the direction of the reciprocating movement of said carriage, and means operable in timed relation with said reciprocating carriage to positively insure the relative transverse movement between said members.

9. In a metal cutting machine, a cutter relief mechanism, comprising a cutter support and a reciprocable member, said support and member being slidingly connected together and being adjustable one with respect to the other in a longitudinal direction and each having cooperating surfaces, the surface of one being inclined whereby said support is bodily moved transversely relatively to said member during their sliding movement.

10. In a metal cutting machine, cutter relief mechanism comprising a cutter support and a reciprocable member, said support and member being slidingly connected together and being adjustable one with respect to the other in a longitudinal direction and each having cooperating surfaces, the surface of one being inclined, and means on said member for engaging said support at each end of the cooperating surfaces to limit the sliding movement therebetween and to connect said support to said member for reciprocation thereby.

11. In a metal cutting machine, cutter relief mechanism comprising a cutter support and a reciprocable member, said support and member being slidingly connected together and having cooperating surfaces, the surface of one being inclined, and means on said member for engaging said support at each end of the cooperating surfaces to limit the sliding movement therebetween and to connect said support to said member for reciprocation thereby, and means to positively insure the sliding movement of said support upon said member.

12. In a metal cutting machine, cutter relief mechanism comprising a cutter support and a reciprocable member, said support and member being slidingly connected together and having cooperating surfaces, the surface of one being inclined, and means on said member for engaging said support at each end of the cooperating surfaces to limit the sliding movement therebetween and to connect said support to said member for reciprocation thereby, and means operable in timed relation relative to the reciprocating movement of said member to insure relative sliding movement between said support and said member in one direction.

13. In a metal cutting machine, cutter relief mechanism comprising a cutter support and a reciprocable member, said support and member being slidingly connected together and having cooperating surfaces, the surface of one being inclined and means on said member for engaging said support at each end of the cooperating surfaces to limit the sliding movement therebetween and to connect said support to said member for reciprocation thereby, means to insure relative sliding movement between said support and said member in one direction and resilient means to assist relative sliding movement between said support and said member in another direction.

14. In a metal cutting machine, cutter relief mechanism comprising a cutter support and a reciprocable member, said support and member being slidingly connected together and having cooperating surfaces, the surface of one being inclined, and means on said member for engaging said support at each end of the cooperating surfaces to limit the sliding movement therebetween and to connect said support to said member for reciprocation thereby, and means operable in timed relation relative to the reciprocating movement of said member to insure relative sliding movement between said support and said member in one direction and resilient means to assist the sliding movement therebetween in another direction.

15. In a metal cutting machine, a reciprocating member, a member adapted to support a tool or the like slidingly mounted thereon, and rotatably mounted means having a camming surface engaging a part of said last mentioned member to move said member relatively to said reciprocating member.

16. In a metal cutting machine, a reciprocable member, means to reciprocate said member, a member adapted to support a tool or the like slidingly mounted upon said reciprocating member, rotatably mounted means having a camming surface engaging said last mentioned member to move it relatively to said reciprocating member, said means being associated with said reciprocating means whereby the last mentioned member will be moved in timed relation relatively to the reciprocating member.

17. In a metal cutting machine, a reciprocating member, a tool holder mounted upon said member, said tool holder including a member slidably mounted upon another member, and a rotatable camming member engaging said tool holder and adapted to positively move said movable member of said toolholder relatively to the other member thereof.

18. Cutter relief mechanism for machine tools, comprising a reciprocable member and a tool support slidingly mounted thereon, cooperating means between said member and said tool support, including an inclined surface whereby when one slidingly moves relatively to the other the tool support will be bodily moved into a position whereby the cutter is closer to said member, and rotatable means adapted to engage one of said parts to move the same relatively to the other.

19. Cutter relief mechanism for machine tools, comprising a reciprocable member and a tool support slidingly mounted thereon, cooperating means between said member and said tool support, including an inclined surface and a stop to limit the relative sliding movement between said member and said support upon said surface whereby when one slidingly moves relatively to the other the tool support will be bodily moved to a position whereby the cutter is closer to said member, said stop being secured to one of said relatively moving parts and being adapted to engage the other whereby both parts will reciprocate together, and rotatable means adapted to engage one of said parts to move the same relatively to the other against said stop.

20. In a metal cutting machine, a work support, a tool carriage, one being reciprocable relatively to the other, a tool support carrying a tool, cooperating means between said tool carriage and said tool support, including an inclined surface upon which said tool support is adapted to slide relatively to said carriage for bodily moving said tool support toward and away from said work support, and means to cause the aforesaid movement of said tool support, including a camming member adapted to engage said tool support.

21. In a metal cutting machine, a work support, a tool carriage, one being reciprocable relatively to the other, a tool support carrying a tool, cooperating means between said tool carriage and said tool support, including an inclined surface upon which said tool support is adapted to slide relatively to said carriage for bodily moving said tool support toward and away from said work support, cooperating means between said tool carriage and said tool support for limiting the relative sliding movement thereof, and means to cause the aforesaid movement of said tool support, including a camming member adapted to engage said tool support.

22. In a metal working machine, a work support, a carriage reciprocable relatively to said work support, a cutter support secured to said carriage and reciprocable therewith and cutter relief mechanism including a cutter shaft extending in a direction substantially parallel with the direction of the reciprocating movement of said carriage, one end of said cutter shaft being rotatably mounted in said cutter support, driving means for said shaft adapted to support the other end thereof, cooperating means between said cutter support and said carriage to move said support and the cutter shaft end supported thereby away from said work support, and means to move the shaft driving means and the shaft end supported thereby in the same direction a substantially equal amount.

23. In a machine tool, a reciprocable carriage, a cutter support slidingly mounted upon said carriage, a cutter shaft rotatably mounted in said support with its axis substantially parallel with the direction of the reciprocating movement of said carriage, in combination with cutter relief mechanism comprising means mounted on said carriage and reciprocable therewith, and a cooperating part on said cutter support operable at the end of each stroke of said carriage to move said support and said cutter radially with respect to the axis of said cutter, and transversely with respect to the direction of the reciprocating movement of said carriage.

24. In a machine tool, a reciprocable member, a cutter support reciprocable therewith, a circular cutter having cutting teeth adjacent its periphery rotatably mounted in said support and secured thereto against relative lineal and lateral movement therebetween, and means on said carriage in cooperating engagement with a part of said cutter support to move said cutter radially with respect to its axis at the completion of each stroke of said carriage.

25. Cutter relief mechanism for machine tools, comprising a reciprocable member and a tool support slidingly mounted thereon, each having cooperating means whereby when one is moved relatively to the other, a relative movement between said parts at right angles to the direction of the first named movement is effected, said support being adjustable on said member longitudinally with respect to the direction of the reciprocating movement of said member without affecting the aforesaid action of said cooperating means.

26. Cutter relief mechanism for machine tools, comprising a reciprocable member and a tool support slidingly mounted thereon, said support being adjustable mounted upon said reciprocable member with respect to the direction of the reciprocating movement thereof, said parts having cooperating means whereby one is engaged by the other for reciprocation thereby, and other cooperating means whereby when one is slidingly moved relatively to the other a relative bodily movement between the parts in a direction transverse to that of the first mentioned movement is effected without affecting the adjustment therebetween.

27. In a metal working machine, a frame, a reciprocating slide mounted on said frame, a cutter support, and means for slidably mounting the cutter support on said slide including an inclined surface upon which the cutter support is adapted to move relatively to and toward the slide.

28. In a metal working machine, a frame, a reciprocating slide mounted on said frame, a cutter support, and means for slidably mounting the cutter support on said slide including an inclined surface upon which the cutter support is adapted to move relatively to and toward the slide, and means to limit the movement of the cutter support on said surface to limit its movement relatively to the slide.

29. In a metal working machine, a frame, a reciprocating slide mounted on said frame, said slide having a guideway thereon, a cutter support carrying a cutter, said cutter support being connected to said slide to move on said guideway in an inclined direction relatively thereto, whereby when the slide moves relatively to the cutter support the cutter will be caused to move in a direction toward and away from the slide.

30. In a metal working machine, a work support, a reciprocable cutter carrier, a cutter holder mounted upon said carrier for bodily adjustment lengthwise of said carrier and for additional bodily movements on the carrier in a plane transverse to the direction of the aforesaid movement to effect a relief of the cutter from the work.

31. In a metal working machine, a frame, a reciprocating slide mounted on said frame, said slide having a guideway thereon, a cutter support carrying a cutter, said cutter support being connected to said slide to move on said guideway in an inclined direction relatively thereto, whereby when the slide moves relatively to the cutter support the cutter will be caused to move in a direction toward and away from the slide, and means to limit the movement of the cutter support on said slide in its movements in the inclined direction.

32. In a metal working machine, a frame, a reciprocatory slide mounted upon said frame, a member mounted on said slide for longitudinal adjustment in the direction of the movement thereof, and a cutter holder mounted on said member for movement relatively thereto in a direction transverse to the movement of the slide.

33. In a metal working machine, a frame, a reciprocatory slide mounted on said frame, a bearing carried by said slide, a spindle journaled in said bearing and having a cutter mounted thereon with its axis parallel to the direction of movement of said slide, and means to effect bodily movements of said spindle toward and from said slide.

34. In a metal working machine, a frame, a reciprocatory slide mounted on said frame, a bearing carried by said slide, a spindle journaled in said bearing and also in another bearing on said frame, a cutter mounted upon said spindle, and means to move both of said spindle bearings in a direction transverse to the spindle axis.

35. In a metal cutting machine, a frame, a work support, a slide reciprocably mounted on said frame, a cutter carried by the slide for movement therewith and also relatively thereto, a shaft journaled in bearings on said frame, a cam on said shaft for movement thereby and being slidable with said slide, said cam being associated with said cutter to move it relatively to the slide to effect a relief movement thereof relatively to said work support, and means to operate said shaft.

36. In a metal cutting machine, a frame, a longitudinally reciprocable spindle mounted upon the frame, a cutter mounted upon one end of said spindle for movement therewith, a casing movably mounted on the frame and having the other end of said spindle journaled therein, cutter relief mechanism including a shaft mounted on said frame, and synchronously operating means operable by said shaft to engage said casing to effect a movement of said spindle and to move said cutter in a direction transverse to the direction of said spindle reciprocating movement.

37. In a metal working machine, a frame, a work support, a cutter reciprocably mounted on said frame, a spindle upon one end of which said cutter is mounted, a casing mounted upon said frame for movement toward and away from said work support, and having the other end of said spindle journaled therein, and cutter relief mechanism including means operable in timed relation with the reciprocating movement of said cutter to move said casing.

38. In a metal working machine, a frame, a work support, a cutter support reciprocably mounted on said frame, a spindle having a cutter mounted upon one end thereof, said spindle being journaled in said cutter support adjacent said cutter, a casing mounted upon said frame for movement toward and away from said work support and having the other end of said spindle journaled therein, and cutter relief mechanism including means operable in timed relation with the reciprocating movement of said cutter support to move said cutter support and said casing transverse to the axis of said spindle.

39. In a metal working machine, a frame, a carriage reciprocably mounted on said frame, a spindle having one of its ends journaled on said carriage, means to support the other end of said spindle upon said frame, and cutter relief mechanism including means acting upon both ends of said spindle to move said spindle transversely to the direction of the reciprocating movement of said carriage.

40. In a metal working machine, a frame, a carriage reciprocably mounted upon said frame, a pair of cutter spindles extending in parallel to each other along said carriage and having an end of each journaled thereon, means to support the other end of each of said spindles upon said frame, and cutter relief mechanism including means acting upon both ends of each of said spindles to move said spindles transversely to the direction of the reciprocating movement of said carriage.

41. In a metal working machine, a frame, a carriage reciprocably mounted upon said frame, a pair of cutter spindles extending parallel to each other along said carriage and having an end of each journaled thereon, means to support the other end of each of said spindles upon said frame, and cutter relief mechanism including means acting alternately upon both ends of each spindle to alternately move said spindles transversely to the direction of the reciprocating movement of said carriage.

42. In a metal working machine, a frame, a carriage reciprocably mounted upon said frame, a pair of cutter spindles extending parallel to said carriage and being disposed one within the other, said spindles having an end of each journaled upon said carriage, means to support the other end of each of said spindles upon said frame, and cutter relief mechanism including means acting upon both ends of each of said spindles to move said spindles transversely to the direction of the reciprocating movement of said carriage.

43. In a metal working machine, a frame, a carriage reciprocably mounted upon said frame, a pair of cutter spindles extending parallel to said carriage and being disposed one within the other, said spindles having an end of each journaled upon said carriage, means to support the other end of each of said spindles upon said frame, and cutter relief mechanism including means acting alternately upon both ends of each spindle to alternately move said spindles transversely to the direction of the reciprocating movement of said carriage.

In testimony whereof I have signed my name to this specification.

WILLIAM EDWIN SYKES.